United States Patent
Altenburger

[15] 3,705,268

[45] Dec. 5, 1972

[54] PASSIVE JUNCTOR CIRCUIT AND SELECTIVELY ASSOCIATED JUNCTOR CONTROL

[72] Inventor: Otto Altenburger, Rochester, N.Y.

[73] Assignee: Stromberg-Carlson Corporation, Rochester, N.Y.

[22] Filed: Dec. 22, 1970

[21] Appl. No.: 100,571

[52] U.S. Cl. ....................179/18 E

[51] Int. Cl. ....................H04q 3/48

[58] Field of Search..179/18 ES, 18 E, 18 EA, 18 EB

[56] References Cited

UNITED STATES PATENTS

| | | | |
|---|---|---|---|
| 3,487,170 | 12/1969 | Pearce et al. | 179/18 ES |
| 3,542,960 | 11/1970 | Schneider | 179/18 E |
| 3,590,165 | 6/1971 | Curtis et al. | 179/18 E |
| 3,270,139 | 8/1966 | Benmussa et al. | 179/18 E |
| 3,636,263 | 1/1972 | Jezioranski et al. | 179/18 E |

*Primary Examiner*—Thomas W. Brown
*Attorney*—Craig, Antonelli, Stewart & Hill

[57] ABSTRACT

A junctor provides a connection circuit for a line link network, trunk link network and service link network, in the form of a passive switching circuit under control of a junctor control. A single junctor control is provided for a plurality of junctors on a time share basis and serves to control each junctor in response to commands from the common control equipment.

28 Claims, 6 Drawing Figures

Figure 1:
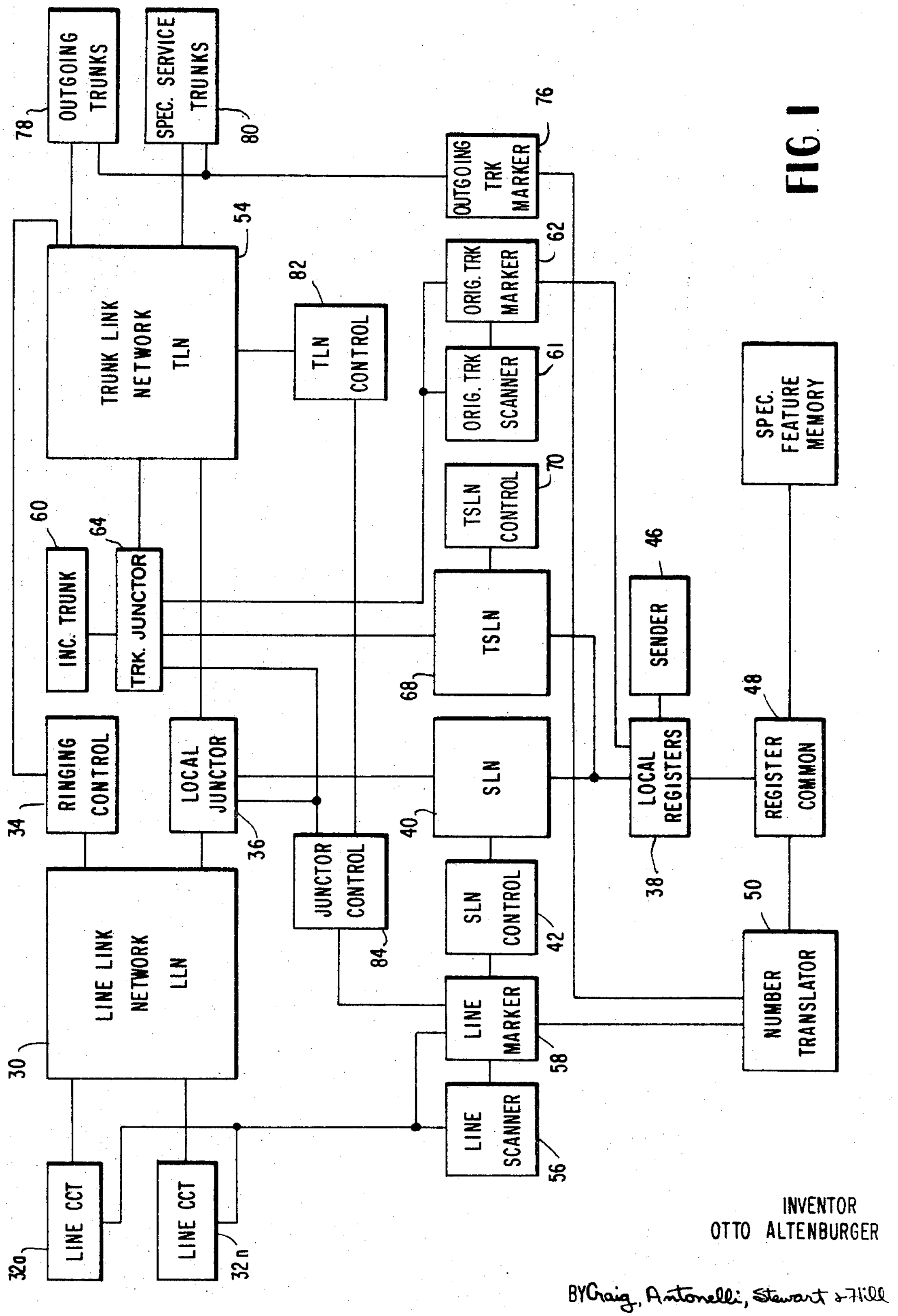

INVENTOR
OTTO ALTENBURGER

BY Craig, Antonelli, Stewart & Hill

ATTORNEYS

INVENTOR
OTTO ALTENBURGER
BY Craig, Antonelli, Stewart + Hill
ATTORNEYS

INVENTOR
OTTO ALTENBURGER
BY Craig, Antonelli, Stewart & Hill
ATTORNEYS

INVENTOR
OTTO ALTENBURGER

BY Craig, Antonelli, Stewart + Hill
ATTORNEYS

PASSIVE JUNCTOR CIRCUIT AND SELECTIVELY ASSOCIATED JUNCTOR CONTROL

The present invention relates in general to automatic common control telephone systems, and more particularly to a junctor and junctor control arrangement for use with such systems.

In known common control telephone systems, circuits referred to as junctors were provided to effect interconnection between line circuits or between a line circuit and an outgoing trunk circuit through link networks under control of a register processer or sequencer. Such circuits at one time included both an originating junctor and a terminating junctor, both of which performed the necessary interconnection of circuits through the link network in accordance with line conditions under control of the register processer. The originating junctor provided access from outputs of a line link network to a register and to a trunk link network for calls originating from subscriber lines. The terminating junctor provided transmission connection between the calling and called parties, extending transmission battery to the telephone instruments of both parties on local calls. The terminating junctor also supplied transmission battery to the called party on calls incoming from trunks, and provided response to answer supervision, to trip ringing and disconnect supervision to release the connection.

In an effort to reduce the cost of access equipment in common control systems and correspondingly reduce the control complexity of this system, a universal junctor circuit was developed by James G. Pearce, William W. Pharis and Gerhard O.K. Schneider, this invention forming the subject matter of U.S. Pat. No. 3,487,170, assigned to he assignee of the present application. This universal junctor circuit was provided in the form of a single circuit associated with a programmed memory for replacing both of the previously required originating and terminating junctor circuits. This circuit included both calling and called line sensors and a plurality of control relays operated under control of a register sender system via a supervisory processing circuit in connection with the programmed memory associated with the junctor circuit to detect both calling and called line conditions and effect the necessary interconnection of common control equipment to the various calling and called line circuits to establish an interconnection therebetween. Thus, the universal junctor circuit was fully programmed to respond to line conditions by effecting selective interconnection between service equipment and the calling and called line circuits as required.

The present invention provides an improvement over the universal junctor circuit disclosed in the aforementioned U.S. patent of James G. Pearce et al., in that it provides a junctor circuit capable of handling both originating and terminating functions and at the same time is considerably simplified in that it is not programmed, but merely provides for the switching functions necessary to effect interconnection between various circuit elements in response to control from the registers and program controls of the system. In association with the junctor in accordance with the present invention, there is provided a junctor control which is time-shared by a plurality of junctor circuits and which provides the necessary equipment to effect control over the junctor to provide for termination of a communication connection to a called line circuit or outgoing trunk circuit.

The junctor control associated with the junctor circuits in the common control system indicates to the junctors whether the call is to be a local or a trunk call and controls the set up of a path through the trunk link network to the terminating line circuit or outgoing trunk circuit, as required. By including the equipment necessary to control the termination of the call in a circuit which may be time-shared among a plurality of junctors, the cost of the system is greatly reduced with considerable reduction in the size and complexity of the individual junctor circuits, and this is achieved without a disadvantageous reduction in the efficiency of operation of the system. The many advantages derived from the features of the present invention will become more apparent from the following detailed description of the invention.

It is a principal object of the present invention to provide an improvement in electronic common control telephone equipment of the type described herein.

It is another object of the present invention to provide an improved universal junctor circuit, which is of reduced size, complexity and cost.

It is another object of the present invention to provide a junctor and junctor control for a common control telephone system which more efficiently effects interconnection between calling and called subscribers.

Figure 2A:
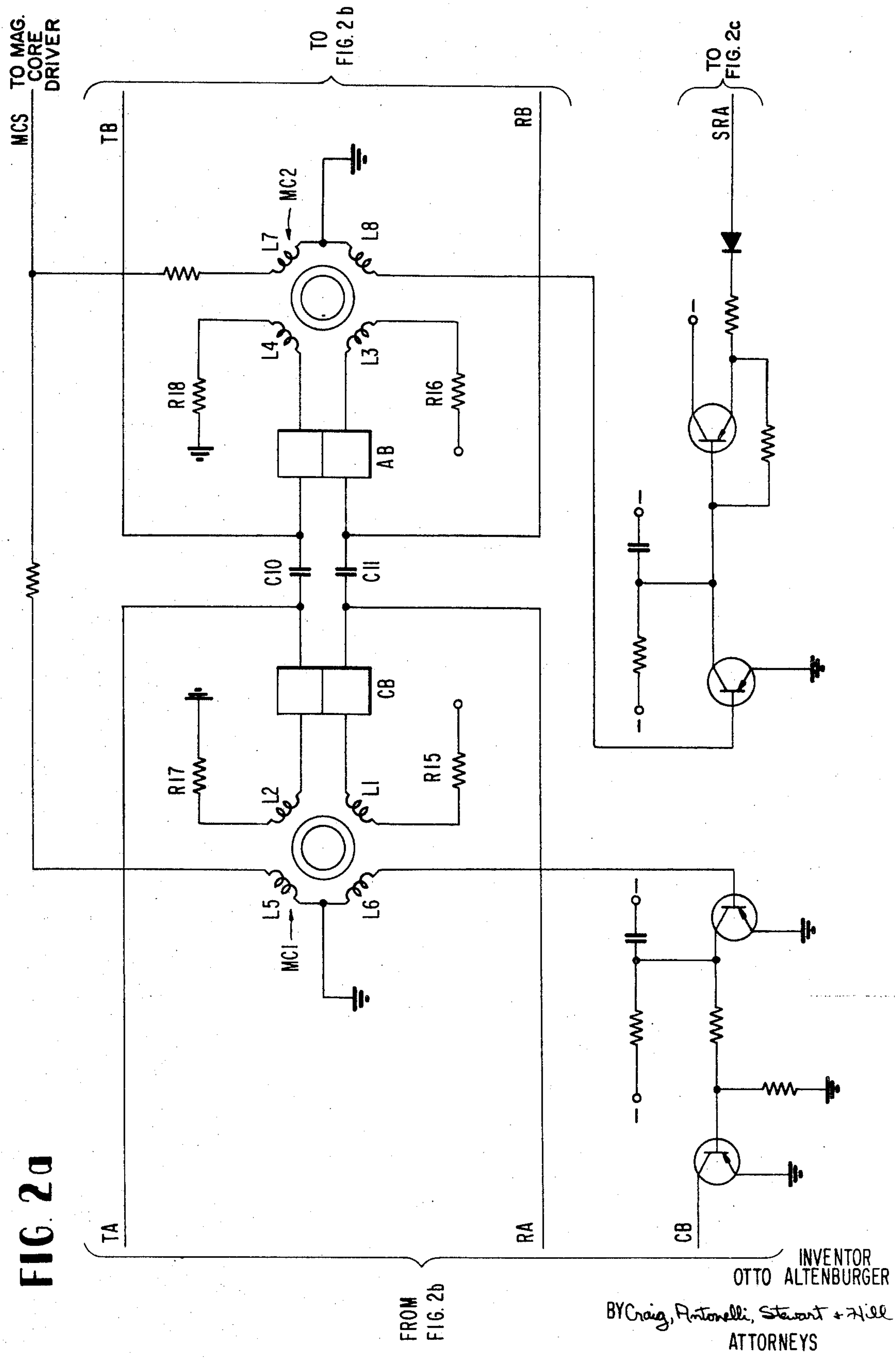
Figure 2B:
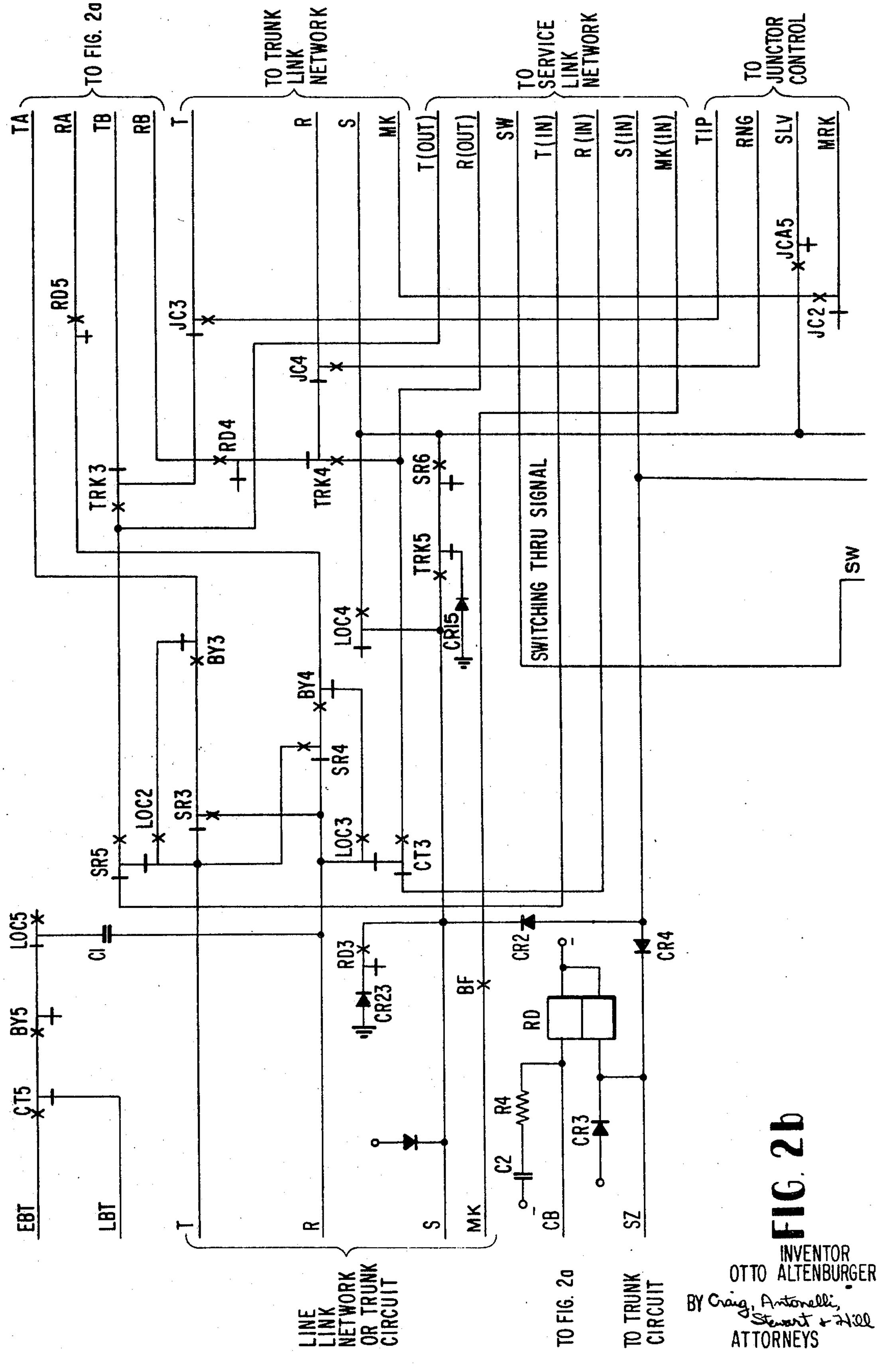
Figure 2C:
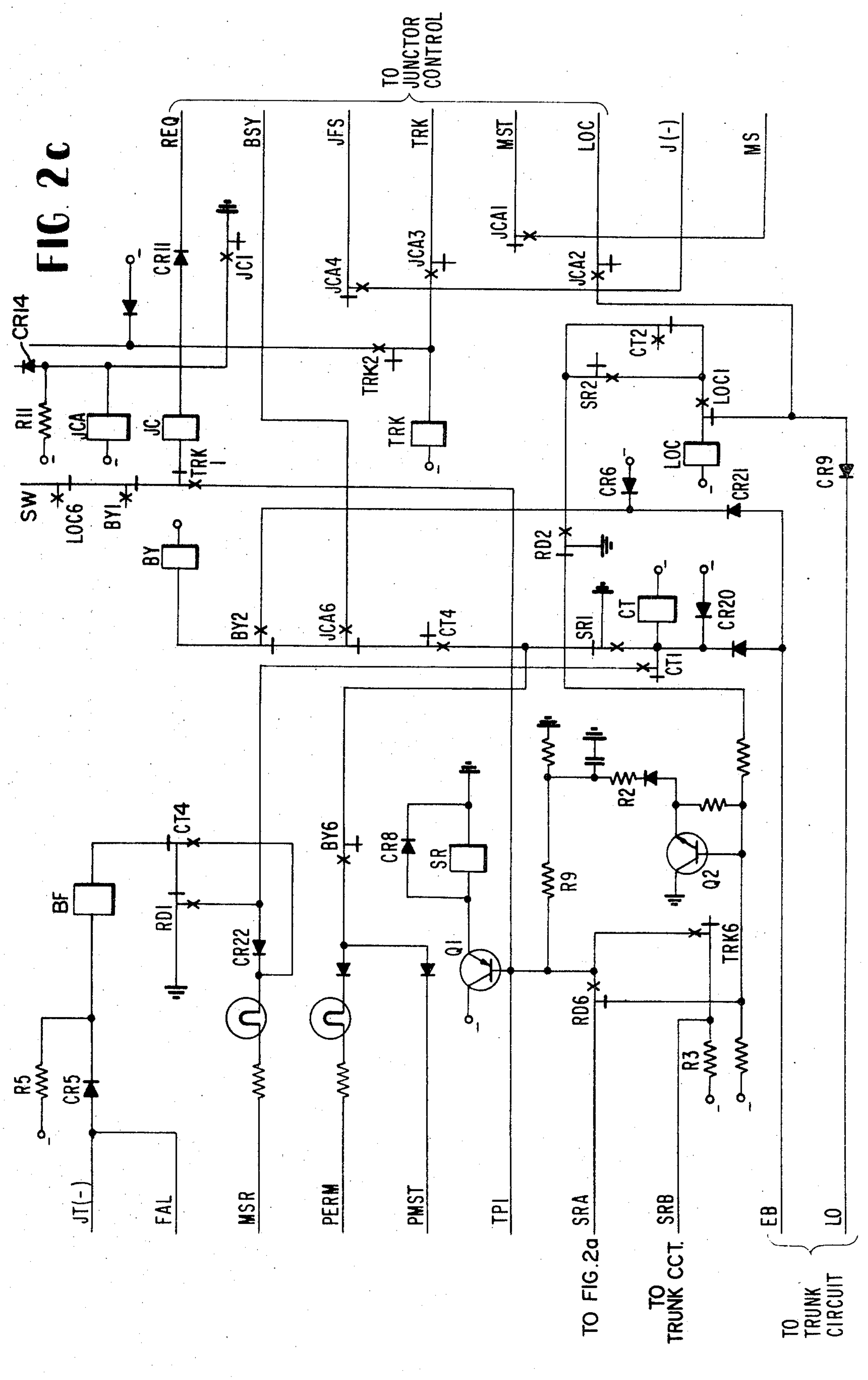
Figure 3A:
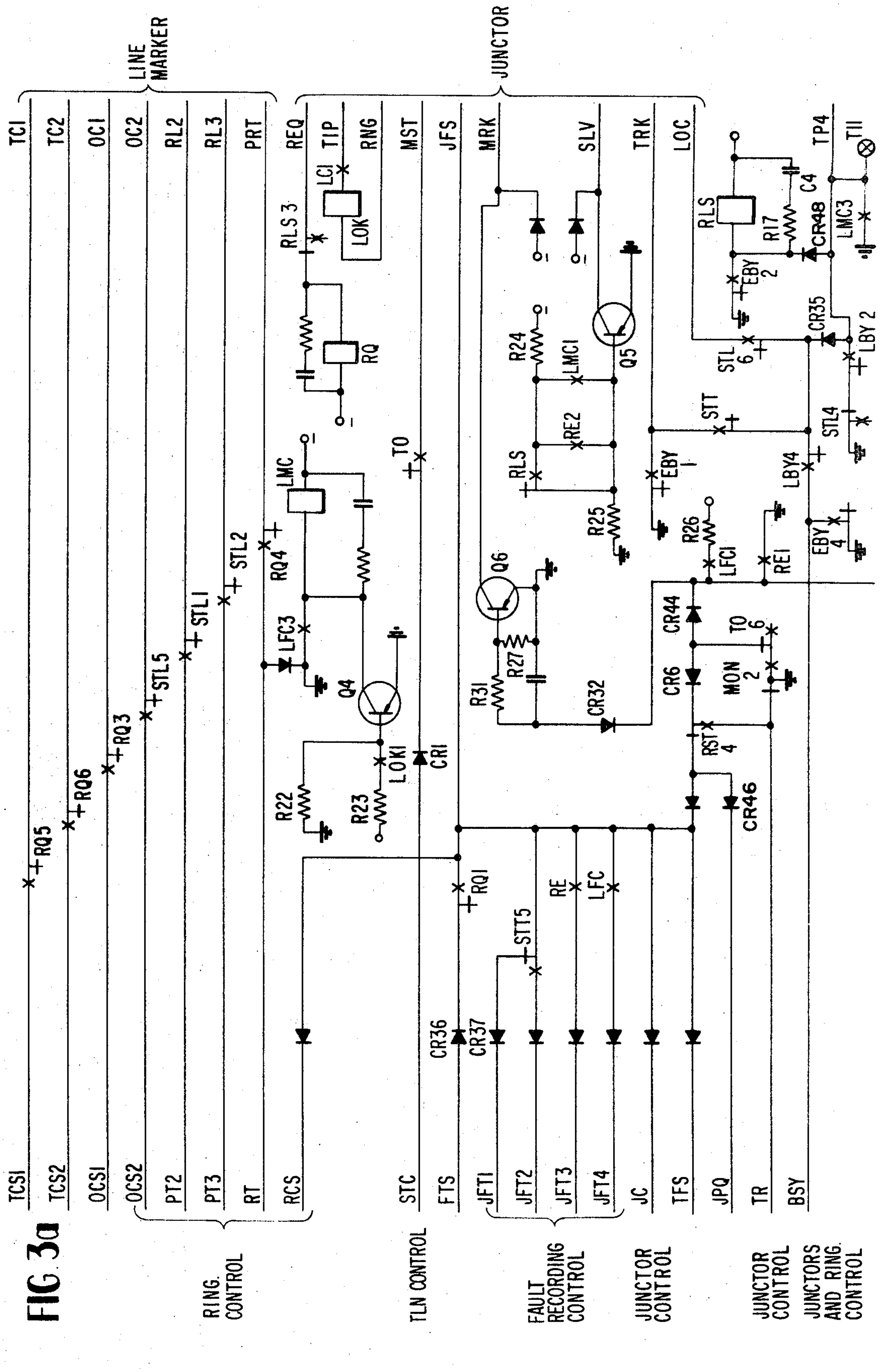
Figure 3B:
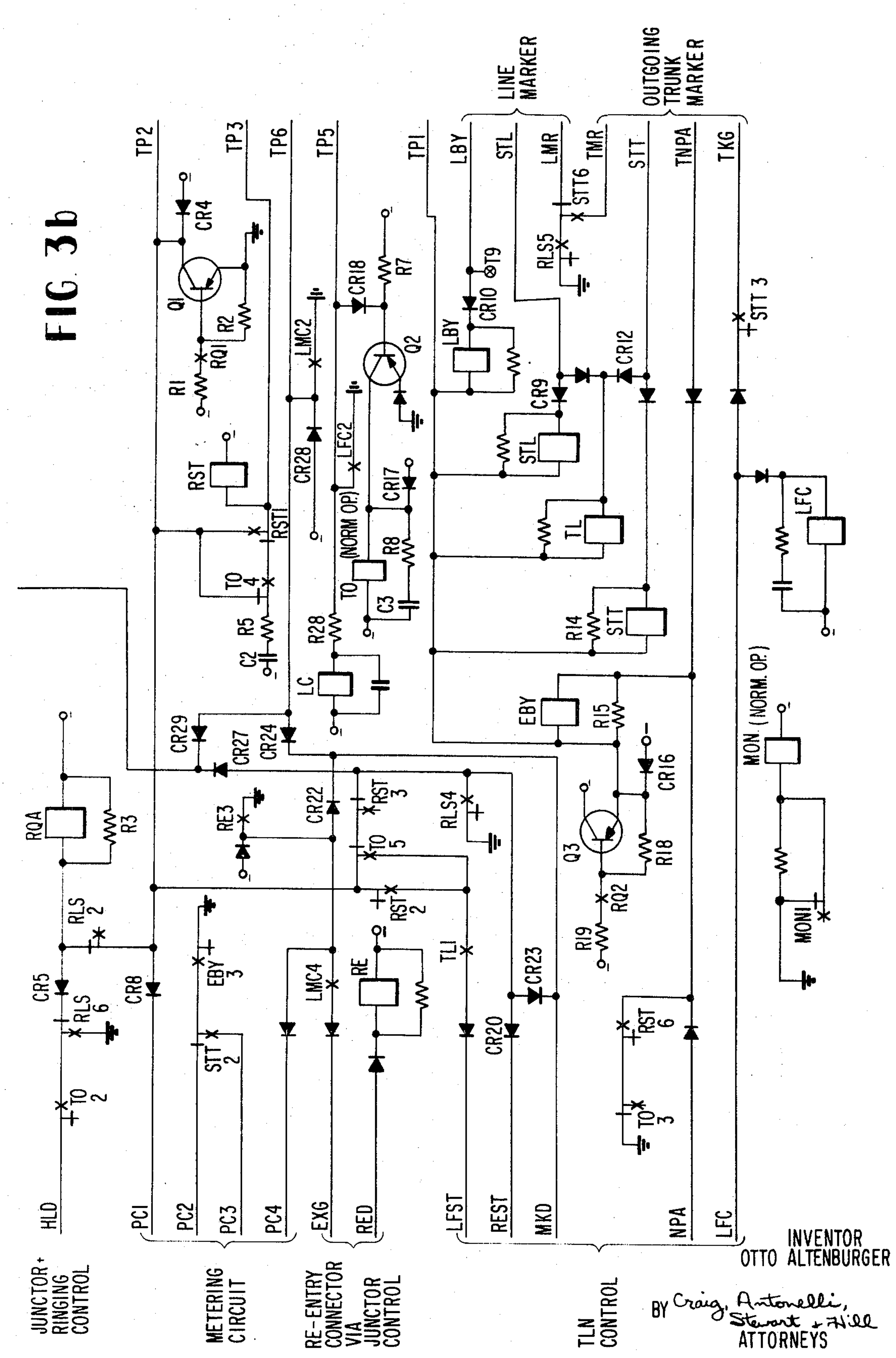

These and other objects, features, and advantages of the present invention will become more apparent from the following detailed description of the invention, when taken in conjunction with the accompanying drawings, which illustrate one example of the present invention and wherein:

FIG. 1 is a schematic block diagram of an electronic telephone system within which is incorporated the features of the present invention;

FIGS. 2*a*, 2*b* and 2*c*, when combined, represent a schematic circuit diagram of the junctor circuit of the present invention; and FIGS. 3*a* and 3*b*, when combined, represent a schematic circuit diagram of the junctor control circuit of the present invention.

GENERAL SYSTEM DESCRIPTION

FIG. 1 of the drawing illustrates a basic block diagram of a telephone system including a plurality of line circuits 32*a* through 32*n* connected to a line link network (LLN) 30, which functions as a concentrator for originating line calls and a fan-out for terminating calls. The line link network 30 may consist, for example, of three stages of matrices which are used for both originating and terminating types of traffic.

The final stage of the line link network 30 provides termination for both originating traffic from the line circuits and incoming traffic to the line circuits. These terminations are connected to the local junctors 36 in the case of originating traffic and to the ringing controls 34 for terminating traffic. The number of local junctors and ringing controls provided depends upon the traffic requirements for the system.

The local junctors 36 include provisions for connecting the line circuits to the local registers 38 through a service link network 40 under control of a service link network control 42. The local junctors 36 also provide transmission battery for both the calling and called parties on intra-office calls, but are under the control of the calling party.

The local registers detect rotary dial pulses or other subscriber signals received from a calling subscriber line circuit, and are also capable of detecting multi-frequency signalling from dial tone telephones. The local registers 38 consist of a dial pulse acceptor, register storage, and register output and can be connected to a sender 46 for providing outpulsing. The registers 38 and senders 46 are controlled by a register common 48, to which they are connected on a time-division multiplex basis. The register common 48 is connected to a number-code translator 50 which provides information such as equipment number, ringing codes, and class of service information. The number-code translator 50 is connected to a line marker 58 and originating trunk marker 62 for purposes of effecting marking of line circuits and trunk circuits during the course of the establishment of a communication connection.

A ringing control 34, which is the subject of my copending application Ser. No. 100,647, filed on Dec. 22, 1970, now U.S. Pat. No. 3,671,678, is connected in each terminating line from the output of the trunk link network 54 to the line link network 30 so that a ringing control is automatically connected to the terminating line circuit as soon as a connection to that line circuit is completed.

A line scanner circuit 56 continuously checks the line circuits 32a–32n to detect an off-hook condition. The line scanner circuit 56 is used for both originating and terminating types of functions. In the event of originating traffic, the line scanner stops when an off-hook condition is detected and transmits the information from its counter circuits to a line marker circuit to mark the particular line circuit 32a–32n and enables the SLN control 42 to initiate a path-finding operation between an available local register and the line circuit requesting service. In the event of terminating traffic, the line scanner is controlled by the number translator, wherein the line scanner receives an equipment number from the number translator to mark the line circuit 32a–32n having the particular equipment location. Furthermore, in terminating traffic, the line marker 58 is also involved in transmitting the terminating subscriber class of service, ringing code, busy or idle status, and types of ringing required through the junctor control to the ringing control 34. The line marker and line scanner form the subject matter of copending application Ser. No. 101,091, filed on Dec. 23, 1970, in the names of Otto Altenburger and Gunter Neumeier.

For handling incoming trunk calls from an incoming trunk 60, there is provided a trunk junctor 64 which is essentially identical to the local junctor 36 but is connected between the incoming trunk 60 and the trunk link network 54. The trunk junctor 64 is connected through a trunk service link network 68 to the local registers 38 and register common 48. Path-finding through the trunk service link network 68 to a local register 38 is provided under control of the trunk service link network control 70. Path-finding through the trunk link network 54 is effected under control of the TLN control 82 in response to the junctor control 84. For purposes of detecting and marking incoming trunks 60 which request service, an originating trunk scanner 61 and originating trunk marker 62 are provided which connect to the local registers 38 and register common 48. For outgoing trunk calls from the exchange, a plurality of outgoing trunks 78 are provided at the output of the trunk link network 54, which trunks are selected and marked by an outgoing trunk marker 76 under control of the number or code translator 50. The outgoing trunk marker forms the subject matter of copending application Ser. No. 103,267, filed on Dec. 31, 1970, in the names of Otto Altenburger and David W. Stoddard. Special service trunks 80 are also connected to outputs of the trunk link network 54 and are marked from the outgoing trunk marker 76.

The operation of the telephone system of FIG. 1 for both local and trunk calls is initially the same. The line scanner 56 in scanning the line circuits 32a through 32n detects a service request and seizes the line marker 58. The line marker 58 in turn actuates the SLN control 42 to start the path-finding through the service link network 40 from an available register 38. The line marker 58 marks the line circuit requesting service and a path is obtained from the local register 38 through the service link network 40, and local junctor 36 and the line link network 30 to the marked line circuit. Dial tone is then returned to the line circuit from the local register 38, notifying the subscriber that he may commence dialing the line number of the called party, In the meantime, the line marker 58 passes on the equipment number of the calling line circuit to the register, which number is then stored in the register 38. The register 38 also requests class of service information and the calling number identification from the number translator 50 at this time.

Upon receipt of the dialed information from the calling subscriber line, the register 38 determines from the number-code translator 50 whether the call is to be a local call or trunk call. In the case of a local call, the number of the called party is translated in the number-code translator 50 to an equipment number and the line marker is seized so as to effect a marking of the called line in accordance with the equipment number derived from the translator. At this time, the junctor control 84 is seized from the line marker 58 and a switch-through signal is forwarded from the local register 38 through the local junctor 36 to the junctor control 84, initiating the termination of the local call. In response to the switch-through signal, the junctor control 84 actuates the TLN control 82 to start the path-finding operation through the trunk link network 54 from the local junctor 36 to the marked terminating line circuit. At this time, the ringing code for the called subscriber is forwarded from the number-code translator 50 through the line marker 58 and junctor control 84 to the ringing control 34. As soon as the called subscriber answers, the local junctor interconnects the calling and called line circuits and releases the common equipment.

The termination of a trunk call is similar to the termination of a local call, with the exception that an outgoing trunk is seized rather than a terminating line circuit. When it is determined that the call will be a trunk call, the outgoing trunk marker 76 is seized and the equipment number designating the trunk group is forwarded from the number-code translator 50 to effect a marking of the trunk group. The outgoing trunk marker 76 then seizes the junctor control 84 and the switch-through signal is forwarded from the local register 38 through the local junctor 36 to the junctor control 84 initiating operation of the TLN control 82 to perform path-finding through the trunk link network 54 from the local junctor 36 to the marked outgoing trunk 78.

Terminating calls from an incoming trunk 60 are handled very much like local calls. The originating trunk scanner 61 detects the request for service from an incoming trunk 60, seizes the originating trunk marker 62 which effects connection of a local register 38 through the trunk service link network 68 to a trunk junctor 64 connected to the incoming trunk 60. The number of the called subscriber line circuit is then received in the local register 38 and the equipment number of this line circuit is derived from the number-code translator 50. A terminating connection from the trunk junctors 64 through the trunk line network to the terminating line circuit is then effected in the same manner as described above in connection with the termination of a local call.

As can be seen from the foregoing description of the telephone system illustrated in FIG. 1, the junctors 36 and 64, along with the junctor control 84, provide a fundamental part of the operation of the system controlling the interconnection of line circuits or trunks and line circuits. The junctor circuit in accordance with the present invention, which may be utilized either as a local junctor 36 or trunk junctor 64, is illustrated in detail in FIGS. 2*a*, 2*b* and 2*c*.

THE JUNCTOR CIRCUIT

The heart of the junctor circuit is a transmission bridge, as seen in FIG. 2a, which provides a talking path and transmission battery to both the calling and called parties on intra-office calls. It also provides for supervision of the call and is under control of the calling party. The transmission bridge consists basically of a calling bridge relay CB and sn answering bridge relay AB, each being coupled to a respective magnetic core detecting circuit MC1 and MC2. Talking battery is connected through resistance R15, winding L1 of the current detector MC1, one winding of the calling bridge relay CB to the line RA extending to the calling line circuit or incoming trunk; while, ground is connected through resistance R17, winding L2 of the current detector MC1, and the other winding of the calling bridge relay CB to the tip lead TA extending to the calling line circuit or incoming trunk. In the same manner, talking battery is connected through the resistance R16, winding L5 of the current detector MC2 and winding of the answering bridge relay AB to the ring lead RB extending to the trunk link network; while ground is connected through resistance R18, winding L4 of the current detector MC2 and the other winding of the answering bridge relay AB to the tip lead TB extending to the trunk link network.

As apparent from the circuit in FIG. 2*a* when the tip and ring leads TA and RA or TB and RB are interconnected, a d. c. loop is completed, actuating the relays CB or AB. At the same time, the closed loop condition is detected by current induced in the windings L5, L6, L7 and L8 of the current detectors MC1 and MC2. The tip leads TA and TB are interconnected by a capacitor C10 and the ring leads RA and RB are interconnected by a capacitor C11, thereby providing a talking path through the transmission bridge while isolating transmission battery on either side of the transmission bridge. The outputs CB and SRA connected to the current detectors MC1 and MC2 effect control of the switching arrangement in the junctor in response to line conditions to the calling and called parties.

As seen in FIG. 2*b*, the junctor in accordance with the present invention relates generally to a four-wire system utilizing tip T, ring R, sleeve S and mark MK leads extending through the link networks to the line circuits and trunks. The tip T and ring R leads form the transmission path for conversation between the parties, while the sleeve lead S serves to maintain the relay contacts in the link networks operated during the term of the call and the mark MK lead is utilized for path-finding through the link networks in the well-known manner.

The switching arrangement provided within the junctor is capable of switching the incoming T, R, S and MK leads, which normally extend to the service link network or trunk service link network, as the case may be, to the trunk link network. In addition, leads from the junctor control can be selectively connected through the junctor to the trunk link network for purposes of initiating and controlling the path-finding operation through the trunk link network. FIGS. 2*b* and 2*c*, when combined, illustrate the junctor in accordance with the present invention, including the relay control portion thereof, with the outputs TA, RA, TB, and RB extending to the transmission bridge in FIG. 2*a*.

A release delay relay RD is provided in each junctor circuit to detect register association for seizing the junctor. A ground mark extending from the register through the service link network into the junctor operates the release delay relay RD which seizes the junctor by disconnecting the normally operated busy-free relay BF therein when the cross-points in the service link network are actuated by ground on the sleeve lead S therethrough. The busy-free relay BF has contacts in the mark lead which extends from the service link network through the junctor to the line link network or trunk group marker, so that release of the busy-free relay BF serves to open the mark lead and prevent further acquisition of the path through the junctor.

Each junctor also includes a supervision relay SR which detects answer supervision in response to operation of the answer bridge relay AB in the transmission bridge. A cut-through relay CT is also provided in the junctor to operate in response to the supervision relay SR to complete the transmission path as a result of detection of answer supervision.

Each junctor also includes a pair of relays which indicate the type of call to be handled by the junctor. One of the relays is the local relay LOC which operates in response to indication from the junctor control that the call will be a local call and the other relay is the trunk relay TRK which operates in response to indication from the junctor control that the call will be a trunk call.

Only two additional relays are provided in each junctor. One of these relays is the junctor control relay JC which operates in response to the switch-through signal received from the register indicating that dialing has been completed and the terminating operation is to begin. The second relay is the junctor control assist relay JCA which operates in response to the junctor control relay JC and serves to connect the junctor control leads through the junctor to the trunk link network during the course of the path-finding operation therethrough.

The operation of the junctor will now be described. In connection with this operation, it should be noted that the input to the junctor on the leads T, R, S and MK may be derived either from the line link network or from an incoming trunk circuit depending upon whether the junctor is a local junctor or a trunk junctor. As will be noted from FIG. 2*b*, these incoming lines from the line link network or trunk circuit are normally connected to the lines T (in), R (in), S (in) and MK (in) extending to the service link network or trunk service link network, so that no particular operation of the control relays in the junctor is necessary during the initial connection of a line circuit or incoming trunk circuit through the service link network to a register, which is the basic originating connection for all calls. Thus, the junctor control and control relay portion of the junctor are necessary only during the terminating portions of the communication connection.

Initially, the description of the operation of the junctor circuit will be presented in connection with the establishment of a local call to a terminating line circuit within the exchange. As indicated previously, the busy-free relay BF is normally operated from negative potential to resistor R5, the winding of the relay and normally closed contacts of the unoperated relays CT and RD to ground. The contacts of the busy-free relay in the mark lead are therefore closed, providing a conductive path on this lead through the junctor to the service link network or trunk service link network, as the case may be. When a path has been found through the service link network from a register through the junctor and the line link network to the calling line circuit, on the mark lead MK, the cross-points of the relays in the service link network are closed by placing ground on the sleeve lead S therein, which ground appears on the lead S (in) to the junctor which actuates the release delay relay RD. As long as the junctor is associated with the call, the release delay relay RD will remain energized and will block ground from the busy-free relay BF to maintain this relay in a de-energized condition. This, of course, opens the mark lead through the junctor and prevents further acquisition of the path through the junctor. In the case of an incoming trunk call, ground will appear on the lead SZ to hold the release delay relay RD in the operated condition, and in the case of a local call, ground will be received on lead CB from the transmission bridge in FIG. 2*a* indicating that the calling line circuit is off-hook and a complete loop condition is detected.

The ground which is received on the S (in) lead from the service link network or trunk service link network also extends via diode CR2 to the sleeve lead S extending to the line link network to hold the cross-points therein in the energized state. Once the release delay relay RD is energized, ground is connected through the contacts of this relay and diode CR23 to the sleeve lead which maintains the path through the line link network for the duration of the call.

After dialing has been completed and all dialing signals have been received by the local register, ground will be extended from the local register through the service link network or trunk service link network on the switch-through lead SW which passes through the normally closed contacts LOC6, BY1 and TRK1 of the local relay LOC, busy relay BY and trunk relay TRK, respectively, to the junctor relay JC which is energized by negative potential applied to the line REQ from the junctor control via diode CR11. The ground which extends from the register on the lead SW is a switch-through signal which not only operates the junctor relay JC but also acquires the junctor control in a manner to be described below. With the operation of the junctor relay JC the junctor assist relay JCA is also operated through the closed contacts JC1 of the junctor relay.

The operation of the junctor relay JC additionally connects the mark lead MRK from junctor control to the mark lead MK extending to the trunk link network via contacts JC2, and connects the tip and ring leads TIP and RNG from the junctor control to the tip and ring leads T and R, extending to the trunk link network via contacts JC3 and JC4.

Operation of the junctor assist relay JCA connects ground on lead MST from the junctor control through contacts JCA1 to the lead MS extending to the trunk link network matrix selector to start the trunk link network control 82 in its path-finding operation. The closing of contacts JCA2 and JCA3 also enable connection of a signal indication on leads LOC and TRK from the junctor control to the local relay LOC and trunk relay TRK to enable the junctor control to operate one or the other of these relays indicating whether the call is to be a local call or trunk call. The closing of contacts JCA4 also extends ground from the line marker or out-going trunk marker through the junctor control on lead JFS to the lead J indicating the local or trunk junctor identity. The closing of contacts JCA6 also connects line BSY from the junctor control to the busy relay BY so that if an equipment-busy or line-busy condition exists, the junctor control can actuate the busy relay BY to connect busy tone back to the calling party.

For a local call, the junctor control will place ground on lead LOC through the contacts JCA2 and the normally closed contacts LOC1 of the local relay LOC to operate that relay. The operation of the local relay LOC indicates that the transmission path to the terminating line circuit has been established. At this point, with operation of the local relay LOC, the tip lead T from the line link network trunk circuit is connected via contacts LOC2 and the normally closed contacts of the unoperated busy relay BY to the lead TA to the transmission bridge, while the ring lead R is connected via contacts LOC3, normally closed contacts BY4 of the unoperated busy relay BY and closed contacts RD5 of the operated release delay relay RD to the line RA of the transmission bridge. At the other side of the transmission bridge, the line TB is connected through the closed contacts TRK3 of the unoperated trunk relay TRK and closed contacts JC3 of the now unoperated junctor relay JC to the tip lead T to the trunk link network, and the lead RB from the transmission bridge extends through the closed contacts RD4 of the operated release delay RD, the closed contacts TRK 4 of the unoperated trunk relay TRK and the closed contacts JC4 of the now unoperated junctor relay JC to the ring lead R to the trunk link network.

The junctor relay JC and the junctor assist relay JCA release immediately upon operation of the local relay LOC as a result of the contacts LOC6 in the line SW providing ground for operation of these relays. Thus, the line link network or trunk circuit connected at the input of the junctor is now switched through to the trunk link network. It should be noted that with operation of the local relay LOC, the relay will lock through its own contacts LOC1, the closed contacts CT2 of the unoperated cut-through relay CT and the closed contacts RD2 of the release delay relay RD to ground. The existence of contacts LOC5 of the relay in the lead EBT to the equipment-busy tone generator also prevents the application of busy tone through the capacitor C1 to the ring lead R back to the line circuit or incoming trunk circuit. Since the operation of the local relay LOC is not effected from the junctor control until a path is established to the terminating line circuit, once the relay operates, it is certain that the equipment is available and the application of busy tone as a result of an equipment-busy condition is no longer necessary.

Ringing is now applied to the called line circuit via the line link network from the ringing control circuit and ringback tone is applied from the ringing control through the trunk link network, the junctor and the line link network to the calling line circuit. The transmission bridge in the junctor will then await response from the called party to the applied ringing. When the called party goes off-hook, ring trip is accomplished in the ringing control circuit and the answering bridge relay AB in the transmission bridge is operated. With the operation of the answering bridge relay AB, talking battery is provided for the called party and an output is applied on line SRA from the transmission bridge through the closed contacts RD6 of the operated release delay RD to the base of transistor Q1 connected between battery and ground in series with the supervision relay SR. The transistor Q1 becomes forward biased by the applied signal so as to be rendered conductive and operates the supervision relay SR indicating that the called party has answered. The operation of the supervision relay SR effects operation of the cut-through relay CT by placing ground through contacts SR1 to the relay. The cut-through relay CT is then held via its contacts CT1 connected through the closed contacts RD1 of the release delay relay RD to ground. The contacts SR2 of the supervision relay SR also provide an alternate path for holding ground to the local relay LOC.

With the operation of the cut-through relay CT, the parties are connected to one another and conversation can take place.

In the case of an outgoing trunk call where the called party is located in a different exchange, the operation of the junctor circuit is the same as for a local call up to the point where junctor control informs the junctor of the type of call being established. AS previously indicated, in connection with a local call, the junctor control will apply ground either to lead LOC or lead TRK depending upon whether the call is a local call or a trunk call. In the case of a trunk call, the ground on lead TRK will pass contacts JCA3 of the junctor assist relay JCA, energizing the trunk relay TRK. This relay immediately locks through its own operated contacts TRK2 to the ground applied to the sleeve lead SLV from the junctor control.

With operation of the relay TRK, negative potential is applied through resistor R3 and the closed contacts TRK6 to the base of transistor Q1 connected in circuit with the supervision relay SR. However, the SR relay will not operate at this time due to ground connected to its base from the switch-through lead SW from the register. In addition, due to the presence of contacts TRK1 in series with the junctor relay JC, this relay and the relay JCA will release with operation of the trunk relay TRK. Also, operation of contacts TRK3 and TRK4 will serve to connect the leads T(out) and R(out) from the service link network to the tip and ring leads T and R to the trunk link network so that the dialed information may be outpulsed to the other exchange through the outgoing trunk circuit.

When a path has been established to the outgoing trunk circuit, the register will release, removing ground from the switch-through lead SW, thereby permitting the supervision relay SR to operate. Operation of the supervision relay SR places ground through contacts SR1 to the cut-through relay CT operating this relay. The cut-through relay CT then locks through its contacts CT1 from ground provided through contacts RD1. With operation of the supervision relay SR and cut-through relay CT, the tip and ring leads T and R from the line link network are cut through via the trunk link network to the trunk circuit for completion of the call.

If, during association of the junctor with the junctor control, while relays JC and JCA are operated, an equipment-busy condition is detected, ground will be provided on the BSY lead from the junction control through contacts JCA6 to operate the busy relay BY, and at the same time, ground is applied on lead TRK from the junctor control to operate the trunk relay TRk via closed contacts JCA3 of the junctor assist relay JCA. Operation of the busy relay BY closes contacts BY5 in the line to the equipment-busy tone generator EBT preparing the application of busy tone through the capacitor C1 to the ring lead R. In addition, the operation of contacts BY1 opens the switch-through lead SW, thereby removing ground from the base of transistor Q1, permitting the supervision relay SR to operate. The closing of contacts BY3 and BY4 in the tip and ring leads along with the operation of the switch-through relay so as to close contacts SR3 and SR4 to reverse the tip and ring leads. As already indicated, operation of the supervision relay SR also produces operation of the cut-through relay CT which completes the connection of the EBT lead through capacitor C1 to the ringing lead R applying busy tone to that line. With the trunk relay TRK operated, closing contacts TRK5, operation of the supervision relay to close contacts SR6 closes the sleeve lead S through the junctor from the line link network or trunk circuit to the junctor control.

If a line busy condition is detected, rather than an equipment-busy condition, the same procedure occurs as above with the exception that the trunk relay is not operated. With the trunk relay not operated, the supervision relay will also not operate and therefore the cut-through relay will not operate. Thus, the LBT lead will be connected to the ring lead R this time.

JUNCTOR CONTROL

The junctor control, as illustrated in FIGS. 3*a* and 3*b*, carries out the control functions necessary to terminate a call to the called line circuit or outgoing trunk circuit. Since only one termination operation may be carried out at one time by the system, only a single junctor control need be provided in association with a plurality of junctor circuits. Basically, the junctor control is responsive to the line marker, outgoing trunk marker, and the trunk link network control to initiate the establishment of a path from the junctor circuit through the trunk link network to a line circuit or outgoing trunk circuit. The path-finding operation, operation of the matrix cross-point relays and application of holding sleeve ground to the trunk link network are provided from the junctor control through the junctor circuit. In addition, as indicated above, the junctor control signals the junctor circuit to indicate the type of call being processed, i.e., a local call or a trunk call. The junctor circuit also performs the necessary tip-ring continuity check once a path is selected through the trunk link network to insure that all of the cross-points have properly operated and that a continuous path in fact does exist. In this regard, the junctor control also provides the appropriate "equipment busy" and "line busy" signals to the junctor.

Referring once again for purposes of example to the procedure relating to the termination of a local call, termination is requested by a register which has received the signals indicating the location of the terminating line circuit. This operation is initiated by the placing of ground on the switch-through lead SW which is routed through the service link network and junctor relay JC in the junctor, as already described, this ground being applied from line REQ in the junctor to the corresponding line in the junctor control as seen in FIG. 3*a*, enabling the request relay RQ through the normally closed contacts RLS3 of the unoperated release relay RLS. The operation of the request relay RQ applies negative potential through resistor R1 and contacts RQ1 to the base of transistor Q1 rendering the transistor conductive and thereby placing the collector thereof at ground potential. This ground potential serves to complete the operate path to the request assist relay RQA through the normally closed contacts RLS2 of the unoperated release relay.

Operation of the request relay RQ also connects negative potential through resistance R19 and contacts RQ2 to the base of transistor Q3 rendering this transistor conductive. As a result, the emitter of the transistor is placed at negative potential which, in combination with a ground mark placed on line STL from the line marker under control of the program control, serves to operate the relay STL to start termination of the local call and relay TL which effects seizure of the TLN control. The operation of relay TL closes contacts TL1 which connects line LFST through the closed contacts TO5 of normally operated relay TO to the line extending to the transistor Q1 which is at ground potential. The ground mark on the line finding start lead LFST to the TLN control initiates the path-finding operation which establishes a path through the trunk link network to the terminating line circuit. When a path has been found, the TLN control places ground on line LFC indicating that line finding is complete. This operates the LFC relay, which turns on transistor Q6 by applying negative potential through resistor R26, contacts LFC1, diode CR32 and resistor R31 to the base of the transistor. The operation of the transistor Q6 places ground on the collector thereof, which ground serves as a mark on lead MRK which is now connected in the junctor to the MK lead to the trunk link network, thereby operating the matrix cross-points in the trunk link network.

Operation of the LFC relay also serves to operate the LC relay by placing ground through contacts LFC2 and resistor R28 to the relay circuit. The relay LC is a delay relay which operates after a delay of approximately three milliseconds. When the LC relay operates, it closes the loop to the tip TIP and ring RNG leads through contacts LC1, thereby performing a continuity check on the path through the trunk link network. It might be remembered that at this time the junctor has connected the tip and ring leads from the junctor control to the T and R leads to the trunk link network. If the path is complete, the relay LOK will operate, which in turn applies negative potential to the base of transistor Q4 through contacts LOK1 and resistor R23, rendering transistor Q4 conductive. Ground is then applied from the collector of the transistor to the circuit for relay LMC, which then actuates. Operation of the LMC relay in turn places negative potential through resistor R24 and contacts LMC1 to the base of transistor Q5, rendering this transistor conductive. The result is the placing of a sleeve ground from the collector of transistor Q5 on the sleeve lead SLV extending through the junctor to the sleeve lead in the trunk link network to hold the cross-points closed along the path selected. Simultaneously, the relay LMC turns off transistor Q6 by applying ground through contacts LMC2 and diode CR29 (FIG. 3*b*) to remove negative potential from the base of the transistor Q6. With the transistor Q6 turned off, ground is removed from the mark lead MRK.

The operation of relay LMC also applies ground to he junctor on lead LOC through contacts LMC3, diode CR35 and contacts STL6 of the operated relay STL. This indicates to the junctor that the call is a local call and initiates the sequence of operations described above for termination of the call through the junctor. The ground applied through contacts LMC3 also serves to operate the release relay RLS, which as seen in FIG. 3b causes ground to be applied through contacts RLS5 and normally closed contacts STT6 of the relay STT to line LMR signalling release of the line marker. The junctor control and TLN control then release.

The procedure for establishing termination of a trunk call is similar to that described above in connection with termination of a local call. The only exceptions are receipt of the start signal from the outgoing trunk marker on lead STT to actuate the relay STT along with relay TL instead of operation of the relay STL from the line STL from the line marker. With operation of the relay STT, rather than the relay STL, on completion of the scanning in the trunk link network, ground will be sent to the junctor on lead TRK, indicating a trunk call, rather than on line LOC, relating to a local call. In addition, with actuation of the release relay RLS, ground will be applied this time to the outgoing trunk marker on lead TMR in view of the operated condition of the relay STT.

As indicated above, when the TLN control has established a path through the trunk link network, it operates relay LFC via the lead LFC indicating that line finding has been completed. Then the ground mark is applied to the mark lead MRK operating the matrix cross-points. After a delay, the LC relay is also operated. Simultaneously, transistor Q2 is disabled, the ground applied through contacts LFC2 to operate the LC relay also cuts off transistor Q2, thereby removing the holding ground from the time-out relay TO. If relay LOK does not operate indicating that the continuity check of the tip and ring leads through the trunk link network is negative, the time-out relay TO will time-out and release after capacitor C3 has discharged.

With the release of the time-out relay TO, ground is applied through the contacts MON2 of the normally operated MON relay, the normally closed contacts of the unoperated time-out relay TO, diode CR6, the normally closed contacts RST4 of the unoperated relay RST, and diode CR46 to line JPQ which initiates a fault print-out in connection with the attempt to establish the terminating connection. Simultaneously, the start signal to the trunk link network is removed because ground is removed from the line LFST to the TLN control as a result of release of the TO relay and opening of the contacts TO5. The TLN control then releases after a delay, removing ground from the lead LFC, causing the LFC relay to release. With the opening of contacts LFC2, ground is removed from the base of transistor Q2 and the time-out relay To operates once again.

With the re-operation of the time-out relay TO, capacitor C2 is connected from negative potential through resistor R5, closed contacts TO4 of the operated time-out relay TO into the normally closed contacts RST1 of the unoperated restart relay RST to operate that relay. The RST relay locks over its own contacts RST1 to ground applied from the collector of transistor Q1. The relay RST is operated by the discharging of the capacitor C2 which was charged during the period of release of the time-out relay TO. With the closing of contacts RST2 of the restart relay RST, the line LFST to the TLN control once again receives a ground mark to initiate the line-finding through the trunk link network.

If, in its attempt to mark the called line, the line marker finds the called line busy, it will place ground on the lead LBY to junctor control operating the line-busy relay LBY. This obviously occurs prior to the start of line-finding and therefore, prior to the operation of the relay STL. Thus, ground is applied through the normally closed contacts STL4 of the unoperated STL relay, the closed contacts LBY2 of the operated LBY relay, diode CR35 and the closed contacts LBY4 of operated LBY relay to the BSY line to the junctor indicating a line-busy condition. At the same time, the release relay RLS is operated from the same ground applied through the diode CR48 which sends a release ground to the line marker on lead LMR and releases the junctor control.

If, on outgoing trunk calls, the outgoing trunk marker cannot find an idle trunk, a ground is placed on lead TNPA from the outgoing trunk marker to operate the relay EBY indicating that the equipment is busy and no path is available. The closing of contacts EBY4 places ground on the line BSY, and ground is also applied through contacts EBY2 to operate the release relay RLS. Since the relay STT is operated in the case of a trunk call, release ground will then be applied to the line TMR to the outgoing trunk marker.

If the TLN control cannot detect an idle path through the matrix, it operates relay EBY by placing ground on lead NPA from the TLN control. Release is then identical with the operation described above in connection with a local call or trunk call release.

In order to reduce the effects of blocking in a matrix-type link network, which, of course, reduces the traffic-carrying capacity of the network, a re-entry function is often provided. This method provides for certain outlets to connect back into inlets of the system providing alternate routing when all the direct first-choice paths are busy. In the re-entry condition, the last stages of the trunk link network are operated as without re-entry (ground is received on lead LFC in the junctor control causing ground to be applied out of the junctor control on the mark lead MRK). When the re-entry connector in the trunk link network has been seized, it sends ground to the junctor control on lead RED, operating the re-entry relay RE. This removes the ground from the base of the transistor Q6 as a result of closing of the contacts RE1 and thereby removes ground from the matrix mark lead MRK from the junctor control and sleeve ground for the last stages of the trunk link network is applied on the sleeve lead SLV as a result of the closing of contacts RE2 connecting negative potential to the base of transistor Q5. The closing of contacts RE3 also connects ground through diode CR22 to line MKD to the TLN control indicating that the mark has been disabled. This also removes the marking battery applied via diode CR9 which was used to operate the last stages of the trunk link network in the re-entry condition.

When the path to the terminating circuit (line circuit or trunk circuit) in the re-entry matrix has been found, ground is placed from the TLN control on line LFC operating the LFC relay and termination is then completed in the manner described above with the exception that ground is sent to the re-entry connector on lead EXG upon operation of the relay LMC through contacts LMC4. The line marker forwards the ringing codes in connection with party-line circuits from the translator to the junctor control, which forwards these codes via leads PT2 and/or PT3. In the same manner, class of service indications are received from the translator via the line marker which forwards the originating class of service on leads OC1 and OC2 and terminating class of service on leads TC1 and TC2, the outputs of these signal indications from the junctor control to the ringing control are on leads OCS1, OCS2, TCS1 and TCS2, respectively If a call cannot be completed, i.e., if the relay LOK does not operate at the time of the continuity check across the tip and ring leads to the trunk link network, the line marker or outgoing trunk marker will time-out and apply ground on lead FTS. At this time a fault analysis can be sent to the fault-recording control via leads JFT1 through JFT4. If the first termination attempt fails, the junctor control can request fault print-out via leads JPQ as indicated above.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In an automatic common control telephone system including a plurality of line circuits and a plurality of trunk circuits, a plurality of junctor circuits and a plurality of registers, a line link network, a trunk link network and a service link network, service control means responsive to subscriber signals for connecting a selected line circuit through said line link network and said service link network via a junctor to a selected register, a junctor control associated with a plurality of junctors for connecting a junctor to said trunk link network, and a trunk control for connecting a junctor to a trunk or a line circuit through said trunk link network, each junctor circuit comprising control relay means normally connecting a plurality of input lines in the junctor to corresponding lines connected to said service link network, a transmission bridge providing a talking path and talking battery, and call designating means responsive to said junctor control for switching said control relay means to either connect said input lines to corresponding lines connected to said trunk link network or to connect said corresponding lines of said service link network to said corresponding lines of said trunk link network.

2. A system as defined in claim 1, wherein said input lines in said junctor include mark and sleeve leads extending from said line link network completely through said junctor to said service link network, said mark lead being used to determine a free path through said service link network and said line link network and said sleeve lead being used to hold a selected path through these networks, each junctor including a busy-free relay having normally closed contacts in said mark lead.

3. A system as defined in claim 2, wherein means is provided for disabling said busy-free relay in response to detection of a holding signal on said sleeve lead.

4. A system as defined in claim 1, wherein said control relay means includes junctor relay means connected to a register via said service link network and to said junctor control for connecting said junctor control to said trunk link network through said junctor in response to a switching signal from said register indicating that all dialed digits have been received.

5. A system as defined in claim 4, wherein said call designating means includes a local relay operated by said junctor control to enable the connection of said input lines to said trunk link network through said transmission bridge.

6. A system as defined in claim 5, wherein said call designating means includes a trunk relay operated by said junctor control for connecting said service link network through said junctor to said trunk link network.

7. A system as defined in claim 6, wherein said relay means includes a supervision relay enabled by said local relay or said trunk relay to connect said input lines to said trunk link network through said transmission bridge, said supervision relay being inhibited by said signal on said line from said register means to said junctor relay means, so as to operate only after said register releases from said junctor.

8. A system as defined in claim 7, wherein said transmission bridge includes an answer bridge relay responsive to completion of a d.c. loop to a called line circuit, said supervision relay being actuated by operation of said answer bridge relay or by a signal from a trunk circuit indicating connection thereof through said trunk link network to said junctor.

9. A system as defined in claim 1, wherein said call designating means includes a local relay operated by said junctor control to enable the connection of said input lines to said trunk link network through said transmission bridge.

10. A system as defined in claim 1, wherein said call designating means includes a trunk relay operated by said junctor control for connecting said service link network through said junctor to said trunk link network.

11. A system as defined in claim 7, further including a line marker for marking terminating line circuits and a trunk marker for marking outgoing trunk circuits, said junctor control including request relay means responsive to said line marker and said trunk marker for actuating said trunk control to connect said junctor to a terminating line circuit or an outgoing trunk circuit through said trunk link network.

12. A system as defined in claim 11, wherein said junctor control includes a local terminating relay enabled by said request relay and operated by said line marker for signalling said trunk control to connect said junctor to a terminating line circuit and a trunk terminating relay enabled by said request relay and operated by said trunk marker for signalling said trunk control to connect said junctor to an outgoing trunk circuit.

13. A system as defined in claim 11, wherein said junctor control includes line complete relay means responsive to a signal from said trunk control indicating a path has been found from said junctor through said trunk link network for testing said path for continuity.

14. A system as defined in claim 13, wherein said junctor control includes a line marking relay responsive to a successful test by said line complete relay means for extending a marking signal to said junctor for application to said trunk link network to acquire said path.

15. A system as defined in claim 14, wherein said line marking relay connects a respective first or second designation signal to said junctor representing a local call or a trunk call to actuate said call designating means therein.

16. A system as defined in claim 13, wherein said junctor control includes time out relay means responsive to said line complete relay means for indicating passage of a predetermined period of time without detecting continuity of the path through said trunk link network and restart relay means responsive to said time out relay means for once again signalling said trunk control to connect said junctor through said trunk link network.

17. A system as defined in claim 11, wherein said junctor control includes re-entry relay means for controlling the marking of the trunk link network through said junctor for a re-entry connection through said trunk link network.

18. In an automatic common control telephone system including a plurality of line circuits and a plurality of trunk circuits, a plurality of junctor circuits and a plurality of registers, a line link network, service control means responsive to subscriber signals for connecting a selected line circuit through said line link network and said service link network via a junctor to a selected register, a junctor control associated with a plurality of junctors for connecting a junctor to said trunk link network, a trunk control for connecting a junctor to a trunk or a line circuit through said trunk link network, a line marker for marking terminating line circuits, and a trunk marker for marking outgoing trunk circuits, said junctor control comprising request relay means responsive to said line marker and said trunk marker for actuating said trunk control to connect a junctor to a terminating line circuit or an outgoing trunk circuit through said trunk link network.

19. A junctor control as defined in claim 18, wherein said junctor control includes a local terminating relay enabled by said request relay and operated by said line marker for signalling said trunk control to connect said junctor to a terminating line circuit and a trunk terminating relay enabled by said request relay and operated by said trunk marker for signalling said trunk control to connect said junctor to an outgoing trunk circuit.

20. A junctor control as defined in claim 18, wherein said junctor control includes line complete relay means responsive to a signal from said trunk control indicating a path has been found from said junctor through said trunk link network for testing said path for continuity.

21. A junctor control as defined in claim 20, wherein said junctor control includes a line marking relay responsive to a successful test by said line complete relay means for extending a marking signal to said junctor for application to said trunk link network to acquire said path.

22. A junctor control as defined in claim 21, wherein said line marking relay connects a respective first or second designation signal to said junctor representing a local call or a trunk call to actuate said call designating means therein.

23. A junctor control as defined in claim 20, wherein said junctor control includes time out relay means responsive to said line complete relay means for indicating passage of a predetermined period of time without detecting continuity of the path through said trunk link network and restart relay means for once again signalling said trunk control to connect said junctor through said trunk link network.

24. A junctor control as defined in claim 18, wherein said junctor control includes re-entry relay means for controlling the marking of the trunk link network through said junctor for a re-entry connection through said trunk link network.

25. A junctor circuit for use in an automatic common control telephone system comprising a set of communication input terminals, first and second sets of output terminals, a set of communication lines connected to said input terminals including tip and ring conductors connected to a transmission bridge providing a talking path and talking battery normally connecting said set of input terminals via said communication lines to said second set of output terminals, call designating means for switching said relay means to connect either said input terminals to said first set of output terminals or said first and second sets of output terminals together, said communication lines further including mark and sleeve conductors, busy-free relay means having normally closed contacts connected in said mark conductor, release-delay relay means responsive to a mark signal on said sleeve conductor for disabling said busy-free relay means, said call designating means including local relay means for connecting said communication lines between said set of input terminals and said first set of output terminals and trunk relay means for connecting said first and second sets of output terminals together, control relay means responsive to a switching signal for selectively enabling said call designating means for independent actuation by respective control signals, and supervision relay means for connecting said communication lines to said transmission bridge, said supervision relay means being normally inhibited by said switching signal applied to said control relay means so as to operate only after release of said call designating means.

26. A junctor circuit as defined in claim 25 wherein said transmission bridge includes an answer bridge relay responsive to completion of a d.c. loop with said tip and ring conductors connected to said input terminals for actuating said supervision relay means.

27. A junctor circuit as defined in claim 26 further including busy equipment relay means responsive to an equipment busy signal for inhibiting actuation of said control relay means.

28. A junctor circuit as defined in claim 27 wherein said control relay means includes a junctor relay responsive to said switching signal for connecting a set of control input terminals to said first set of output terminals.

* * * * *

UNITED STATES PATENT OFFICE
CERTIFICATE OF CORRECTION

PATENT NO. : 3,705,268

DATED : December 5, 1972

INVENTOR(S) : Otto Altenburger

It is certified that error appears in the above-identified patent and that said Letters Patent are hereby corrected as shown below:

| | |
|---|---|
| Col. 1, line 36 | "he" should read ---the---. |
| Col. 5, line 44 | "sn" should read ---an---. |
| Col. 9, line 45 | After "delay" insert ---relay---. |
| Col. 10, line 42 | "junction" should read ---junctor---. |
| line 46 | "TRk" should read ---TRK---. |
| Col. 12, line 50 | "he" should read ---the---. |
| Col. 13, line 39 | "To" should read ---TO---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*